United States Patent
Niva et al.

(10) Patent No.: US 7,072,428 B2
(45) Date of Patent: Jul. 4, 2006

(54) METHOD AND APPARATUS FOR SYNCHRONIZATION

(75) Inventors: Ilkka Niva, San Diego, CA (US); Kaj Jansen, Salo (FI); Kjell Ostman, Halikko (FI)

(73) Assignee: Nokia Mobile Phones Limited, Espoo (FI)

( * ) Notice: Subject to any disclaimer, the term of this patent is extended or adjusted under 35 U.S.C. 154(b) by 1009 days.

(21) Appl. No.: 09/915,382

(22) Filed: Jul. 27, 2001

(65) Prior Publication Data

US 2002/0154719 A1 Oct. 24, 2002

(30) Foreign Application Priority Data

Jul. 28, 2000 (GB) .................................. 0018668.4

(51) Int. Cl.
*H04B 1/10* (2006.01)
*H04L 1/00* (2006.01)

(52) U.S. Cl. ...................... 375/348; 375/137; 375/145; 375/149; 375/329; 375/347

(58) Field of Classification Search ................ 375/142, 375/143, 145, 150, 151
See application file for complete search history.

(56) References Cited

U.S. PATENT DOCUMENTS

| 5,590,160 | A | | 12/1996 | Ostman | 375/367 |
| 5,978,423 | A | * | 11/1999 | Farjh | 375/347 |
| 6,078,611 | A | * | 6/2000 | La Rosa et al. | 375/147 |
| 6,154,487 | A | * | 11/2000 | Murai et al. | 375/150 |

FOREIGN PATENT DOCUMENTS

| WO | WO 97 28608 A | 8/1997 |
| WO | WO 00/21201 | 4/2000 |

\* cited by examiner

*Primary Examiner*—Mohammed Ghayour
*Assistant Examiner*—Freshteh N. Aghdam
(74) *Attorney, Agent, or Firm*—Antonelli, Terry, Stout & Kraus, LLP

(57) ABSTRACT

The present invention provides a method and a device in which two or more fingers of a RAKE receiver can locked to a multipath received signal in a situation of a fat finger impulse response. One embodiment of the present invention assigns two RAKE fingers to an impulse response so that one finger tracks the impulse response with an Early-Ontime DLL method and the other finger is tracking the impulse response with an Ontime-Late DLL method. The method comprises detecting the delay between the received signal and a delayed version, comparing the delay with a predetermined threshold and when the delay falls below the threshold, changing the tracking method of the delayed version of the received signal to a second tracking method.

11 Claims, 7 Drawing Sheets

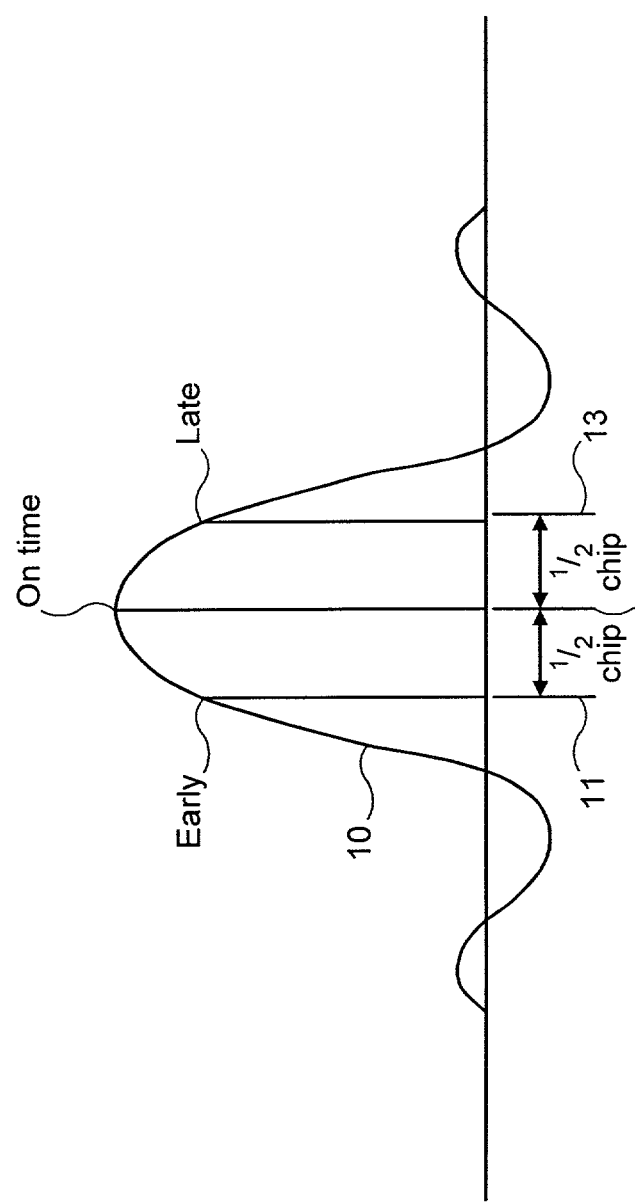
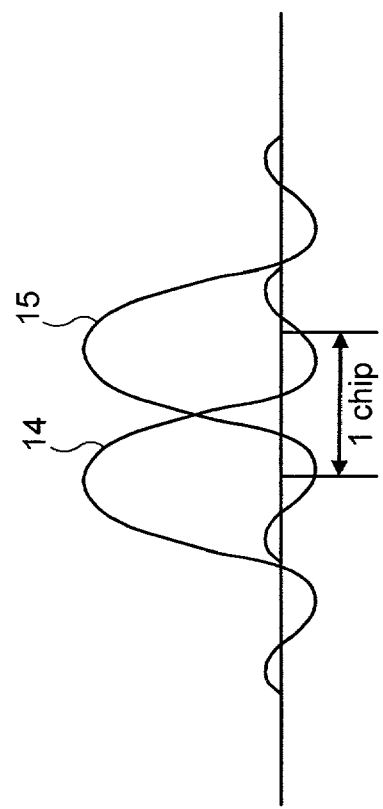

NOT A FAT FINGER STATE

FINGER 1:

Early: 7 (chip n-1)
On time: 3 (chip n)

FINGER 2:

Early: 0 (chip n+3)
On time: 4 (chip n+3)

FAT FINGER STATE DETECTED

FINGER 1:

Early: 7 (chip n-1)
On time: 3 (chip n)

FINGER 2:

On time: 4 (chip n+1)
Late: 0 (chip n+2)

METHOD AND APPARATUS FOR SYNCHRONIZATION

BACKGROUND OF THE INVENTION

1. Field of the Invention

The present invention relates to receiver synchronization, and more particularly to code tracking in a CDMA system having, but not exclusively, application to the field of mobile telephones.

2. Description of the Prior Art

In a radio communication system the symbol clocks of the transmitter (Base Station, BS) and a receiver (Mobile Station, MS) are unsynchronized. A synchronization method for the receiver is thus needed to synchronize the symbol timing i.e. the symbol clock in a receiver to the received symbol sequence. In CDMA system the symbol synchronization is more often called chip synchronization since the synchronization between the receiver chip clock and the received chip sequence is determined. Moreover, in a CDMA system a method is needed to keep the receiver spreading sequence aligned to that of the transmitter (BS), so the method is also referred to as code tracking.

This synchronization, in general, is achieved by extracting a suitable control signal from the received signal, and using a phase locked loop to keep the error between the extracted control signal and a locally generated copy of the control signal as small as possible. One such known technique is based on Delay-Locked Loop (DLL) where the combined impulse response of the transmitter filter, communication channel and receiver filter is computed in the receiver based on the received signal. The DLL then tries to minimize the difference between the delay of the channel and the reference delay of the locally generated impulse response.

One known DLL tracking method is called as Early-Late DLL method where one sample of the impulse response is calculated half of a chip earlier and another sample is calculated one half of a chip later than the desired sampling point.

Another method, called as Early-Ontime DLL, is known from U.S. Pat. No. 5,590,160 where one sample of the impulse response is calculated half of a chip earlier than the desired sampling point and another sample is calculated at the desired sampling point. The DLL then uses the sample values in phase locked loop to control the synchronization timing. In U.S. Pat. No. 5,590,160 a DLL operation is disclosed where the ratio of these samples is compared to a reference ratio, and the result is used as an error signal for the phase locked loop.

One problem in a wireless communication relating to synchronization is the multipath propagation. In that situation the received signal is a superposition of several versions of the transmitted signal, delayed by various delays with the signal versions having random phases and amplitudes. The impulse response is consequently also a superposition of several versions of the combined transmitter and receiver impulse responses, which means that the original impulse response is distorted by this superposition. This distortion is particularly difficult if the delay between two or more impulse responses is between 0.2–2 symbols (or chips in CDMA). This condition is commonly known as a "fat finger" case. If the delay difference is smaller than 0.2 symbols (chips), the impulse response is not that distorted but this case can cause a situation called flat fading where different signal versions cancel each other out. On the other hand, if the delay is more than 2 symbols, the impulse responses do not effect each other much and the combined impulse response may be viewed as two separate impulse responses.

In U.S. Pat. No. 5,590,160 the Early-Ontime DLL is used in a spread spectrum receiver where the receiver consists of a several receivers, known as fingers. Each finger is used to demodulate its own version of the delayed signal, and the output from the individual fingers is coherently combined. This type of receiver is commonly known as a RAKE receiver. In a RAKE receiver the DLL is used to lock each separate finger to a distinguishable signal copy. However, when the above mentioned fat finger case happens neither Early-Ontime nor Early-Late DLLs can provide optimal operation since they do not allow all of the energy in the fat finger to be demodulated. The problem is that DLLs in each finger are locking the fingers to the same position, thus providing no gain. In other words, although these different DLLs (Early-Ontime and Early-Late DLLs) are locking on to different places of the fat finger, the demodulated energy is however roughly equal in both cases.

SUMMARY OF THE INVENTION

A first aspect of the present invention is a method for synchronizing a receiver where the method comprises steps of:

tracking the received signal by a first receiver branch using a first tracking method, the signal being sampled at a first sampling time;

tracking a delayed version of the received signal by a second receiver branch using said first tracking method, the signal being sampled at a second sampling time;

detecting the delay between the received signal and its delayed version; comparing the delay with a pre-determined threshold and in the case when the delay falls below the threshold, tracking the delayed version of the received signal by a second tracking method.

A second aspect of the present invention is a device for synchronizing a receiver comprising: a converter for sampling the received signal and a delayed version, a first receiver branch for tracking the received signal using a first tracking method with the signal sampled being at first sampling time, a second receiver branch for tracking a delayed version of the received signal using the first tracking method with the signal sampled being at a second sampling time, means for determining the delay between the received signal and a delayed version, means for comparing the time delay with a pre-determined threshold and means for changing the tracking method for the delayed version of the received signal to a second tracking method.

The present invention provides a method in which two fingers of a RAKE receiver can be locked to a multipath received signal in a way which enables improved demodulation, specially in the fat finger case mentioned above. In the case of a fat finger impulse response, one embodiment of the present invention assigns two RAKE fingers to a fat finger impulse response; One finger tracks the impulse response with an Early-Ontime DLL method and the other finger tracks the impulse response with an Ontime-Late DLL method. This has an advantage that the DLL loops keep the RAKE fingers as apart as possible, which means that the correlation between the signals that each finger is demodulating is minimized. In other words, this means that these two fingers are capable of demodulating the signal energy at a different position of a signal in a fat finger impulse response.

A further embodiment of the invention is a way to allocate more than two fingers to sample the multipath received signal in a fat finger impulse response situation. In one modification, the first finger tracks the rising edge of the impulse response (Early-Ontime DLL) and the second finger tracks the falling edge (Ontime-Late). The further one or more intermediate fingers are then positioned to a predetermined distance from the finger tracking the rising edge. The intermediate finger(s) thus have their DLLs disabled. The intermediate finger(s) follow the position of the Early-Ontime finger as the DLL in the Early-Ontime finger changes the position of the leading finger. In this situation the position of the intermediate finger(s) is changed by the same amount. In a second modification there is no finger allocated for the falling edge of the fat finger impulse response, but there is only one finger tracking the rising edge (Early-Ontime) and all other fingers are set to follow that tracking finger. This allocation of further fingers is advantageous in the case where the shape of impulse response estimate is fat enough that the demodulation can be improved allocating more than two fingers to the impulse response.

BRIEF DESCRIPTION OF THE DRAWINGS

Exemplary embodiments of the invention are hereinafter described with the reference to the accompanying drawings, in which:

FIG. 1a shows a symbol waveform with different sampling points;

FIG. 1b shows a fat finger impulse response situation;

DETAILED DESCRIPTION OF THE PREFERRED EMBODIMENTS OF THE INVENTION

Figure 2:
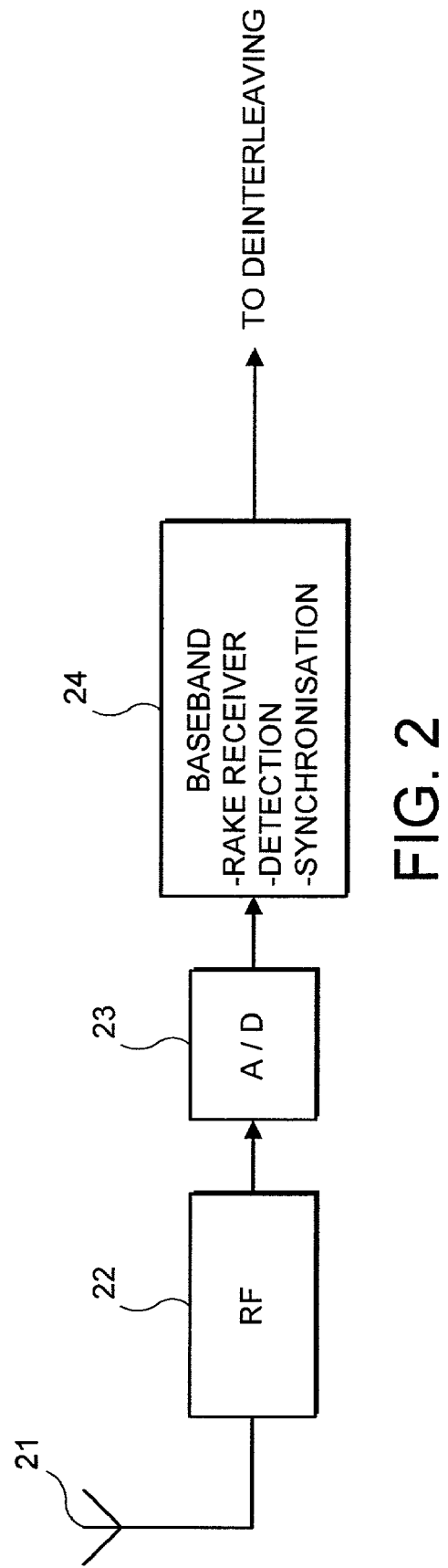
FIG. 2 shows a block diagram of a radiotelephone utilizing the invention

FIG. 1a shows one example of the received sample signal 10 and sampling pulses 11, 12, 13 in different locations of the sample signal. In the Early-Ontime method, the sampling is ideal, i.e. the synchronization is reached, at time instants 11 and 12. In the Early-late method the sampling is correspondingly done at time instants 11 and 13. The sampling times are separated by a ½ chip period.

FIG. 1b shows the impulse response estimate in a fat finger situation. This figure shows a case where the difference between the impulse response peaks is 1 symbol time (1 chip) so that the impulse responses 14, 15 are partly aligned.

FIG. 2 shows a block diagram of a radiotelephone employing the synchronizer according to the present invention. In this description the reference is only made to the reception path of the signal as it will be clear to those skilled in the art that approximately the same steps occur in the transmission path, but in a reverse order. First the antenna 21 provides the input to RF block 22 which performs the necessary filtering operations and down-converts the received RF signal, in one or more steps, to a lower frequency and to be processed in baseband 24. In the reception path an A/D 23 conversion is applied to a signal to enable digital signal processing in baseband 24. Baseband processing 24 comprises the receiver blocks including the RAKE receiver, detection and the synchronization referred in this invention. The reception path further includes blocks (not shown in the figure) like decryption, de-interleaving, channel decoding and speech decoding after which the received speech/data is output to the user.

Figure 3:
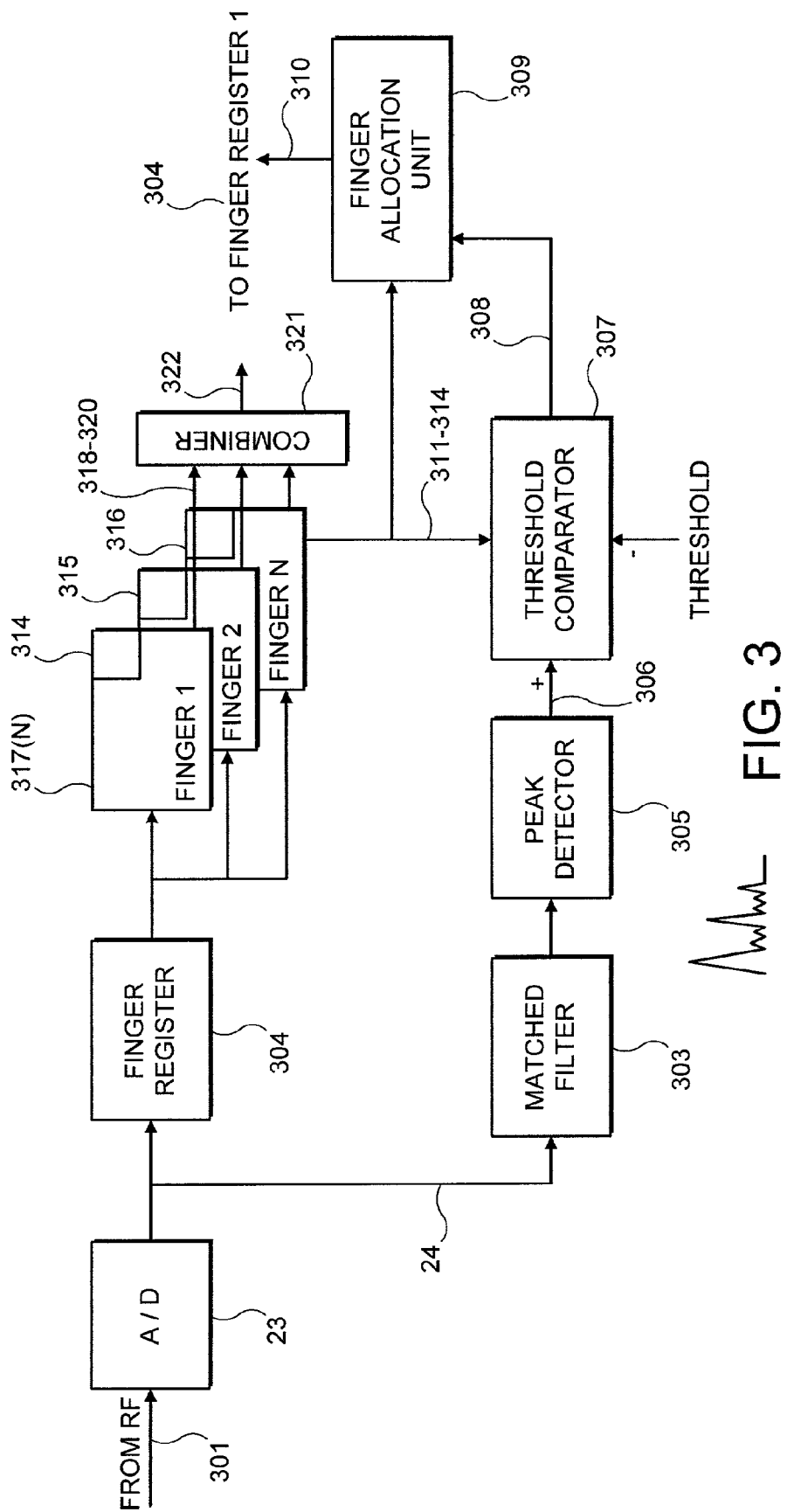
FIG. 3 shows a block diagram of an apparatus of the present invention.

FIG. 3 shows in more detail one embodiment of receiver of the present invention. The received signal typically comprises signals described as I and Q components. However, here for the clarity, only one of the branches is shown. The signal 301 from the RF is first converted to a digital presentation by an A/D converter 23. The telecommunication system where the apparatus of present invention is operable can be based on a chip rate of e.g. 4.096 Mchip/s. The A/D converter 23 then uses a certain number of clock cycles per chip, e.g. 8 samples/chip, to sample the received signal 301. The sampled digital signal 24 is then input to a matched filter 303 and stored in finger input register 304 from which the digital samples are selected to corresponding fingers as described later in detailed. The number of fingers (N in FIG. 3) in the RAKE receiver is an implementation issue, N being e.g. 5.

Figure 4:
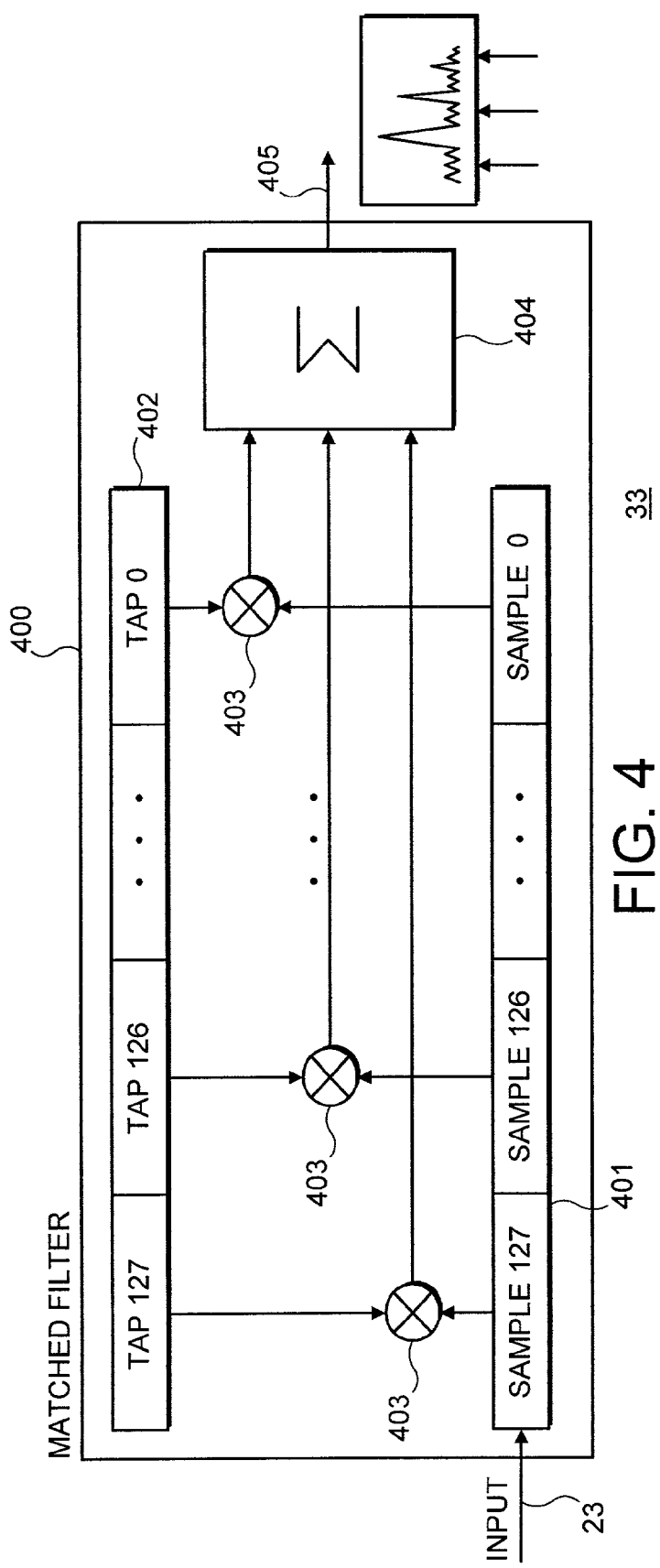
FIG. 4 shows a block diagram of a matched filter.

Referring now to FIG. 4, one example of a matched filter 303 of FIG. 3 is described in more detailed. The matched filter includes two registers; a register 401 receives the digital samples 24 from the A/D converter 23. The register size may be e.g. 127 samples. Register 402 stores a predefined code/data, which is searched from the incoming data 23. The matched filter further includes multiplying units 403 and a summing unit 404 for determining the correlation between the received data 23 and the pre-stored code in register 402. The matched filter outputs a signal 405 estimating the impulse response for the received signal 23, which shows peaks when the pre-stored data equals the received data. These different peaks correspond to the different multipath received signal components. Correlation calculation done by the matched filter can be presented as follows:

$$y(t) = \frac{1}{N}\sum_{n=1}^{N} x(t - nT_s)s(n)$$

where the N is register length (e.g. 127), $T_s$ is sampling period, s(n) is the prestored code and x(t) is the incoming data from A/D converter.

In FIG. 3 the signal from the matched filter 303 is provided to peak detector block 305, which stores the signal from the matched filter 303 and determines locations of the peaks corresponding to the multipath delays. The peak detector 305 can be implemented by a register or memory, which stores the samples from the matched filter 303. Known DSP (Digital Signal Processing) functions/algorithms can then be utilized to search the peaks and the corresponding locations. Peak detector 305 outputs a digital signal 306 indicative of a time delay between different multipath signals i.e. time between the peaks. In other words, the signal indicates the difference between peaks 1 and 2, 2 and 3, and so on. Those time differences are then utilized in threshold comparator 307, which determines whether any of those time differences falls below a certain threshold. When it is detected that the threshold is not met, a signal 308 is output to finger allocation unit 309 which causes changing of the sampling times of a corresponding RAKE finger. For example if the time difference between $3^{rd}$ peak and $2^{nd}$ peak falls below the threshold, then the tracking method of the finger 3 is changed as described further in this specification (assuming that the finger 3 is tracking the $3^{rd}$ peak). In other words, the finger allocation unit has a control to select by a signal 310 from the finger input register 304 the right signal samples to be used by the fingers so that certain samples are used in code tracking in certain RAKE fingers as described further in FIG. 5. The operation of threshold comparator and the finger allocation unit can be implemented by using a DSP's existing arithmetical operations.

FIG. 3 also shows an alternative way to implement the present invention. In this embodiment of the present invention the finger position information 311–313 from finger position counters 314–316 within each RAKE finger are used by the threshold comparator 307 to detect the positions of the fingers and to determine whether the time difference between the location of the fingers falls below a certain threshold. The finger position information 311–313 is also provided to finger allocation unit 309 which allocates the fingers according to present invention as described later in this specification. If having e.g. 8 samples/chip, as in the example above, then each finger position is known by the accuracy of ⅛ chip. One way to implement the position counter is presented in U.S. Pat. No. 5,590,160.

Signal samples from the A/D converter 23 are also provided to the RAKE receiver having a certain number N of fingers 317(1)–317(N) for tracking the received multipath signals. The different demodulated and despread multipaths of the same signals 318–320 are then combined in the combiner 321 in order to receive maximum energy to be used by the detector of a receiver. The detected data 322 is then further provided to de-interleaving processing (not shown in the figure).

Figure 5:
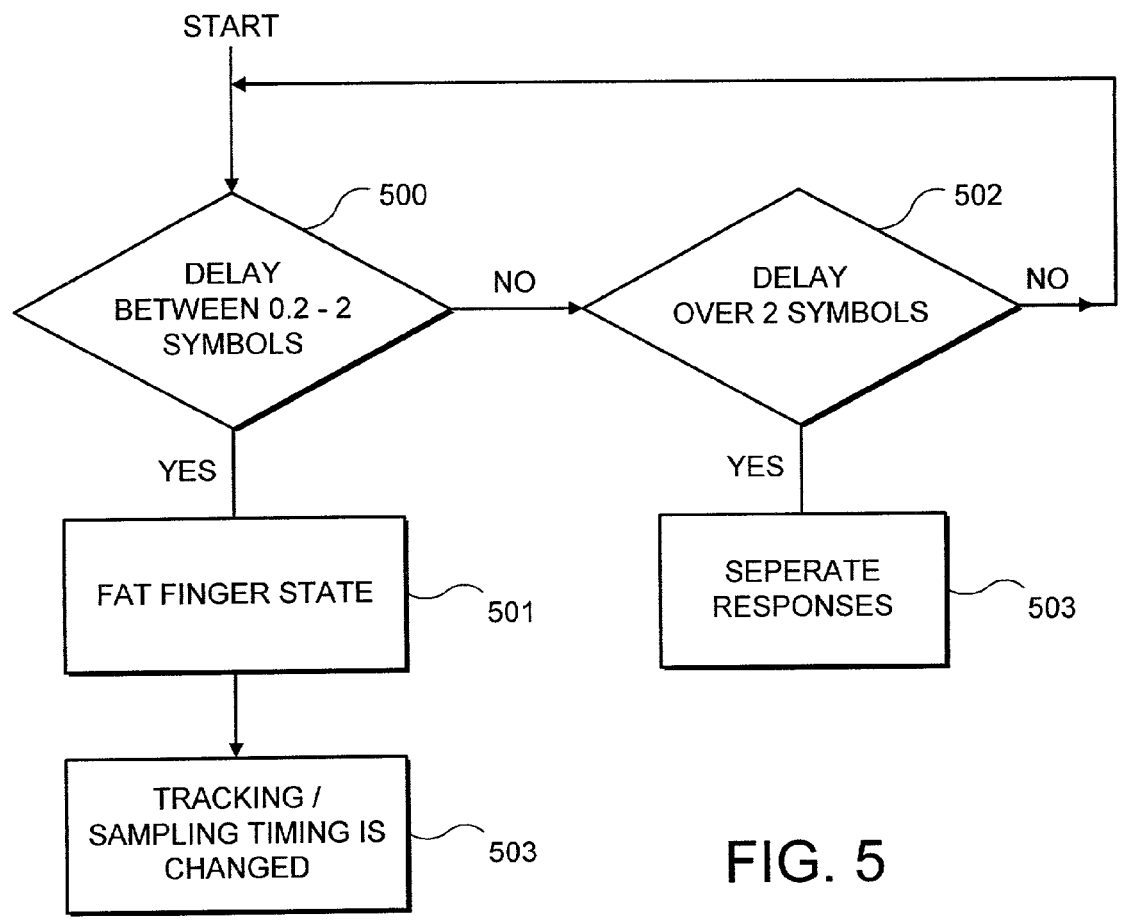
FIG. 5 shows a flow diagram in accordance with the present invention.

FIG. 5 shows a flow diagram of the method according to one embodiment of the present invention. The procedure is started by the step 500 where the time difference between the different impulse response estimates is determined. At the starting step, the fingers of the RAKE receiver are operating by using Early-Ontime or Early-Late principles described earlier. If the delay between the impulse response estimates is between 0.2–2 symbols (chips), a fat finger state 501 is detected. If the decision was negative it is then determined at step 502 whether the delay is over 2 samples which means that estimated impulse responses are virtually non-overlapping and can be regarded as a separate impulse responses and the state 504 is detected. If the decision at block 502 is negative which means that the delay is less than 0.2 symbols, no actions are needed to change the sampling timing of the RAKE fingers and the procedure enters the starting point 500. When the fat finger state is detected at 501 the tracking method of at least one the RAKE fingers is changed at 503. According to one embodiment of the invention the tracking in first finger is done to using Early-Ontime principle and the tracking in second finger is done using Ontime-Late principle.

Figure 6:
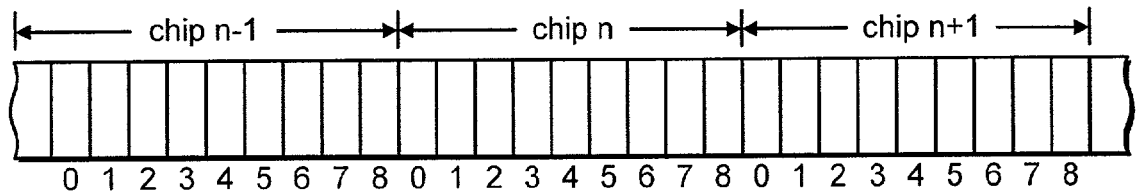
FIG. 6 shows a diagram illustrating an implementation of the present invention.

FIG. 6 shows one embodiment of the invention, which clarifies more the operation of the block 503 in FIG. 5. At the starting point when the fat finger state is not detected, fingers of the RAKE receiver are operating based on Early-Ontime or Early-late principle. For example let's have an example where the Early-Ontime is used and the A/D converter is outputting 8 (0–7) samples per chip. In this case the sampling for the finger 1 at a certain time instant can be such that the early sampling is done at the sample number 7 (chip n−1) and the on-time sampling is done at sample number 3 (chip n). Finger 2 may then have e.g. early sampling at sample number 0 and the On-time sampling at sample number 4 (e.g. during chip n+3). Finger 3 then may have again a different sampling timing depending on the multipath signal that finger is tracking. When the detection is done based on the signal from the matched filter or based on the information from finger position counters that the time delay between the impulse response estimates falls below a certain time limit (e.g. 2 chips), the tracking method of one of the fingers is changed. According to one embodiment the tracking method of one finger is changed. Here in our example the tracking of the finger 2 is then changed from Early-Ontime to Ontime-Late so that the on-time sampling would be then e.g. at sample number 4 (chip n+1) and the late sampling at sample number 0 (chip n+2). In other words, in this example the time delay between the tracking fingers 1 and 2 during the fat finger state is 1⅛ of chip period.

Figure 7:
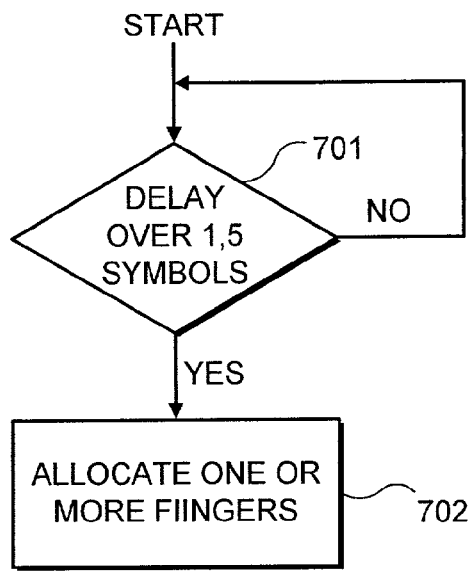
FIG. 7 shows a flow diagram illustrating the finger allocation in accordance with the present invention.

FIG. 7 below shows a flow diagram of another embodiment of the present invention where more than two fingers are allocated to a fat finger impulse response. First it is determined at step 701 if the distance between two fingers allocated to a fat finger is much more than 1 chip; e.g. 1.5 of chip period. If the answer is positive then one or more further fingers is allocated at step 702 to a fat finger impulse response. In this case the first finger is tracking the rising edge of the impulse response by the Early-Ontime DLL method and the second finger is tracking the falling edge of the fat finger impulse response by the Ontime-Late method as described earlier. In this embodiment of the invention one or more further fingers are allocated to follow the position of the first finger so that a predetermined distance is used between the first and one or more intermediate fingers. For example let's have situation, where finger is 1 having samples 7 (chip n−1) and 3 (chip n) for Early and Ontime samples and finger 2 is having samples 2 (chip n+2) and 6 (chip n+2) for Ontime and Late samples. In this case the difference between the Ontime samples of finger 1 and finger 2 is 15 samples. Now, according to this embodiment of the invention one or more fingers can be allocated to sample during this 15 samples (i.e. 1⅞ of a chip period). For example, a $3^{rd}$ finger can be allocated to sample at sampling time 3 (chip n+1) so the sampling for that finger would be a predefined as 8 samples later than the Ontime sampling for finger 1. Alternatively, if allocating two intermediate fingers (fingers 3 and 4), then the sampling for finger 3 could be defined e.g. 5 samples after Ontime sampling (i.e. sample 0 (chip n+1)) of finger 1 and the sampling for finger 4 would then be 10 samples from the Ontime sampling point of finger 1 (sample 5 (chip n+1)). In a similar way more than 2 intermediate finger can also be allocated.

Still one more modification is possible where no fingers are set to track the falling edge (or rising edge) of the fat finger impulse response. In this case one finger tracks the rising edge (or falling edge) and all other fingers follow the tracking finger in the manner described earlier.

Figure 8:
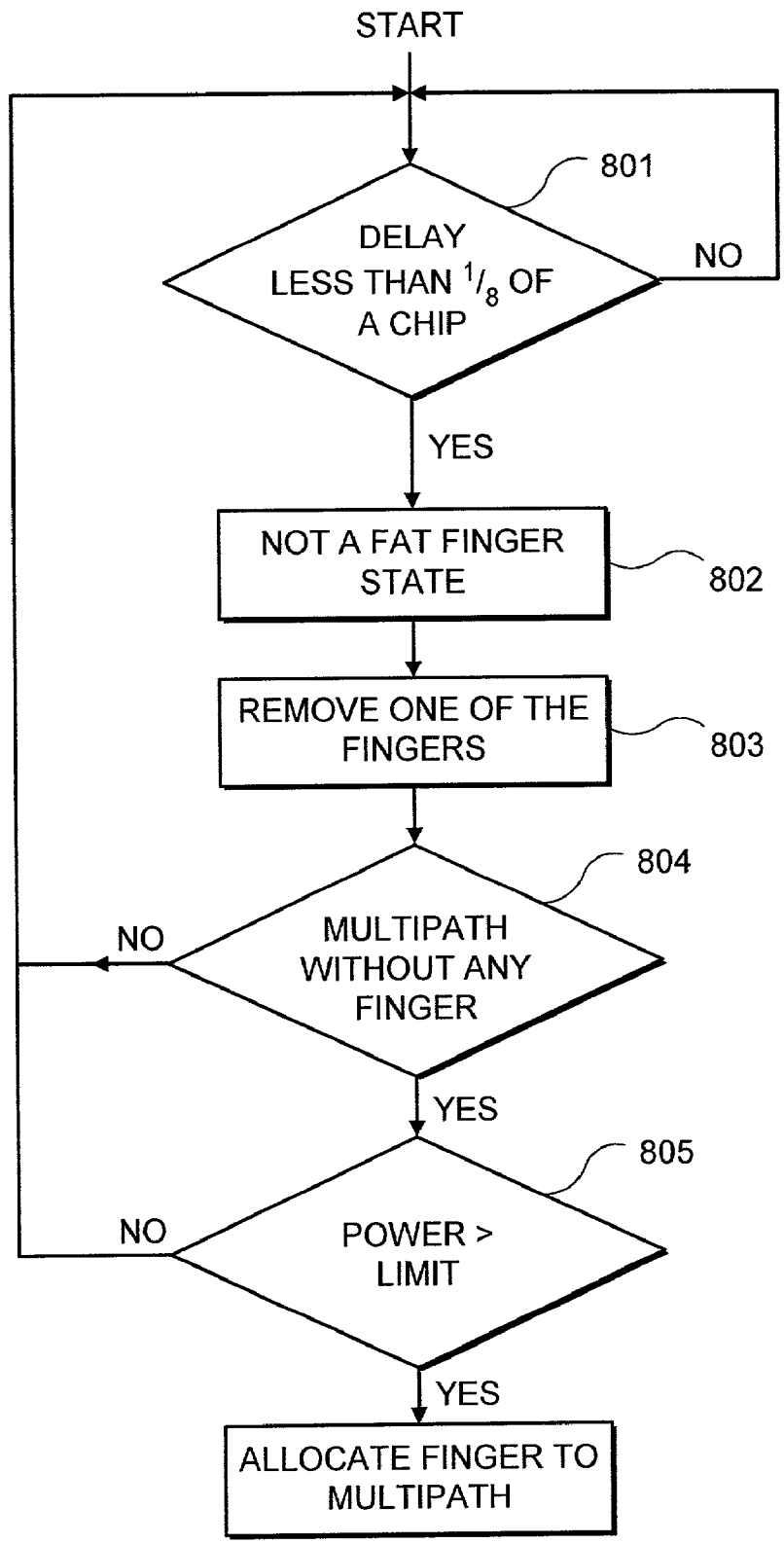
FIG. 8 shows a second flow diagram illustrating the finger allocation in accordance with the present invention.

FIG. 8 shows still one embodiment of the present invention where the positions of the RAKE fingers are monitored by using the position counters in FIG. 3 or by detecting the peaks from the matched filter. At step 801 it is determined if the fingers are detected to get too close to each other e.g. less than ⅛ of a chip, it is determined at 802 that the impulse response is not of a fat finger type. In this case one of the fingers allocated for the fat finger is removed at step 803. Now, If a multipath is detected at 804, that is not demodulated by a finger and the power of the multipath exceeds a predetermined threshold (step 805), the de-allocated finger is assigned to this multipath.

In the view of foregoing description it will be evident to a person skilled in the art that various modifications may be made within the scope of the present invention.

The invention claimed is:

1. A method for synchronizing a receiver comprising the steps of:
    tracking a received signal by a first receiver branch using a first tracking method with the signal being sampled at a first sampling time;
    tracking a delayed version of the received signal by a second receiver branch using the first tracking method, the signal being sampled at a second sampling time;
    detecting the delay between the received signal and a delayed version thereof;
    comparing the delay with a pre-determined threshold and when the delay falls below the threshold, tracking the delayed version of the received signal by a second tracking method; and
    wherein the first and second tracking methods differ from each other in that for a common input the first and second tracking methods have at least partially different sampling instances.

2. A method according to claim 1, wherein the first tracking method tracks the rising edge of an impulse response estimate.

3. A method according to claim 1, wherein the second tracking method tracks the falling edge of an impulse response estimate.

4. A method according to claim 1, comprising: comparing a time difference with a second threshold when the time difference exceeds the second threshold, allocating a third receiver branch for sampling the received signal at a third sampling time other than the first and second sampling times.

5. A method according to claim 4, wherein the third sampling time occurs at a pre-determined time from the first sampling time.

6. A method according to claim 4, wherein the third sampling time is a sampling occurring at a pre-determined time, the predetermined time being before the second sampling time.

7. A method according to claim 4, comprising allocating a fourth receiver branch for sampling the received signal at a fourth sampling time different from the first, second and third sampling times.

8. A method according to claim 1, wherein the detecting the delay between the received signal and a delayed version thereof comprises a determination of a correlation between the received signal and a predefined code.

9. A device for synchronizing a receiver comprising: a converter for sampling the received signal and a delayed version thereof, a first receiver branch for tracking the received signal using a first tracking method with the signal being sampled at a first sampling time, a second receiver branch for tracking a delayed version of the received signal using the first tracking method with the signal being sampled at a second sampling time, means for determining a delay between the received signal and the delayed version thereof, means for comparing the time delay with a pre-determined threshold and means for changing the tracking method for a delayed version of the received signal to a second tracking method; and
    wherein the first and second tracking methods differ from each other in that for a common input the first and second tracking methods have at least partially different sampling instances.

10. A device according to claim 9, comprising means for comparing a time difference with a second threshold, and means for allocating a third receiver branch, when a time difference exceeds the second threshold, for sampling the received signal at a third sampling time different from the first and second sampling times.

11. A device according to claim 10, comprising means for allocating a fourth receiver for sampling the received signal at a fourth sampling time other than the first, second and third sampling times.

* * * * *